US008817457B1

(12) United States Patent
Colby et al.

(10) Patent No.: US 8,817,457 B1
(45) Date of Patent: Aug. 26, 2014

(54) REVERSIBLE FOLIO FOR TABLET COMPUTER WITH REVERSIBLE CONNECTION FOR KEYBOARD AND READING CONFIGURATION

(71) Applicant: ZAGG Intellectual Property Holding Co., Salt Lake City, UT (US)

(72) Inventors: Jim Colby, Highland, UT (US); Dan Oakeson, West Jordan, UT (US)

(73) Assignee: ZAGG Intellectual Property Holding Co., Salt Lake City, UT (US)

( * ) Notice: Subject to any disclaimer, the term of this patent is extended or adjusted under 35 U.S.C. 154(b) by 0 days.

(21) Appl. No.: 14/146,438

(22) Filed: Jan. 2, 2014

(51) Int. Cl.
- *G06F 1/16* (2006.01)
- *E05C 17/56* (2006.01)
- *B65D 85/00* (2006.01)
- *A45C 11/00* (2006.01)

(52) U.S. Cl.
CPC ............ *G06F 1/1669* (2013.01); *G06F 1/1667* (2013.01); *A45C 11/00* (2013.01)
USPC ............ 361/679.29; 361/679.55; 361/679.56; 292/251.5; 206/320

(58) Field of Classification Search
USPC ............. 361/679.01–679.45, 679.55–679.59; 292/251.5; 206/320; 345/156, 157, 345/168, 169, 905; 16/221–392
See application file for complete search history.

(56) References Cited

U.S. PATENT DOCUMENTS

| 6,937,468 | B2 | 8/2005 | Lin et al. |
|---|---|---|---|
| 7,541,907 | B2 * | 6/2009 | Wang et al. ................. 335/305 |
| 7,583,500 | B2 | 9/2009 | Ligtenberg et al. |
| 7,672,699 | B2 | 3/2010 | Kim et al. |
| 7,966,040 | B2 | 6/2011 | Kim et al. |
| 8,143,983 | B1 | 3/2012 | Lauder et al. |
| D659,139 | S | 5/2012 | Gengler |
| D671,541 | S | 11/2012 | Gengler |
| D672,352 | S | 12/2012 | Gengler |
| D673,574 | S | 1/2013 | Gengler |
| 8,363,014 | B2 * | 1/2013 | Leung et al. .................. 345/169 |
| D676,031 | S | 2/2013 | Melville et al. |
| D676,853 | S | 2/2013 | Gengler |
| D678,885 | S | 3/2013 | Gengler |

(Continued)

OTHER PUBLICATIONS

Eee Pad Transformer TF101; http://www.asus.com/Tablets_Mobile/Eee_Pad_Transformer_TF101 accessed Apr. 12, 2013.

(Continued)

*Primary Examiner* — Nidhi Desai
(74) *Attorney, Agent, or Firm* — Thorpe North & Western LLP

(57) ABSTRACT

A reversible folio for a tablet computer has a tablet shell with a cavity removably receiving the tablet computer. A proximal edge of the tablet shell has a symmetrical profile different from a non-symmetrical profile of the table computer. A keyboard pivotally and removably coupled to the tablet shell. A channel is pivotally coupled to an edge of the keyboard. An interior of the channel removably receiving the proximal edge of the tablet shell, and has a symmetrical profile mating with the symmetrical profile of the tablet shell. The channel and proximal edge have first and second symmetrical magnet arrays, respectively. The proximal edge of the tablet shell physically mates with the channel of the keyboard, and the second magnet array of the tablet shell magnetically mates with the first magnet array of the channel, in both a first orientation and an opposite second orientation.

21 Claims, 10 Drawing Sheets

(56) References Cited

U.S. PATENT DOCUMENTS

| | | | |
|---|---|---|---|
| 8,390,412 B2 | 3/2013 | Lauder et al. | |
| D682,274 S | 5/2013 | Gengler | |
| 8,599,542 B1* | 12/2013 | Healey et al. | 361/679.17 |
| 2004/0209489 A1 | 10/2004 | Clapper | |
| 2006/0152897 A1 | 7/2006 | Hirayama | |
| 2008/0119250 A1 | 5/2008 | Cho et al. | |
| 2008/0125200 A1 | 5/2008 | Park et al. | |
| 2008/0139261 A1 | 6/2008 | Cho et al. | |
| 2008/0176610 A1 | 7/2008 | Pan et al. | |
| 2012/0008269 A1 | 1/2012 | Gengler | |
| 2012/0008299 A1 | 1/2012 | Gengler | |
| 2012/0114198 A1 | 5/2012 | Yang et al. | |
| 2012/0188697 A1 | 7/2012 | Cheng et al. | |
| 2012/0243149 A1* | 9/2012 | Gartrell et al. | 361/679.01 |
| 2012/0293953 A1* | 11/2012 | Wu et al. | 361/679.56 |
| 2012/0327580 A1 | 12/2012 | Gengler | |
| 2012/0327594 A1 | 12/2012 | Gengler | |
| 2013/0170126 A1* | 7/2013 | Lee | 361/679.17 |
| 2013/0229354 A1* | 9/2013 | Whitt et al. | 345/169 |
| 2013/0242490 A1* | 9/2013 | Ku | 361/679.3 |
| 2013/0279096 A1* | 10/2013 | Gengler | 361/679.01 |
| 2013/0301205 A1* | 11/2013 | Fyke | 361/679.26 |

OTHER PUBLICATIONS

Brydge; http://thebrydge.com/ accessed Apr. 12, 2013.
Lenovo Ideapad U1 Hybrid Notebook; http://uncrate.com/stuff/lenovo-ideapad-u1-hybrid-notebook/ accessed Apr. 12, 2013.
ClamCase® iPad Keyboard Cases & Stands; http://clamcase.com/ accessed Apr. 12, 2013.
iPad Keyboards, Cases, & Stands; ZAGGkeys PROplus iPad Keyboard; http://www.zagg.com/keyboard-cases/index.php accessed Apr. 12, 2013.
iPad Keyboards, Cases, & Stands; ZAGGkeys PROfolio; ZAGG Keyboards & Cases; http://www.zagg.com/keyboard-cases/index.php accessed Apr. 12, 2013.
iPad Keyboards, Cases, & Stands; ZAGGkeys PROfolio +; ZAGG Keyboards & Cases; http://www.zagg.com/keyboard-cases/index.php accessed Apr. 12, 2013.
iPad Keyboards, Cases, & Stands; ZAGGkeys PRO; ZAGG Keyboards & Cases; http://www.zagg.com/keyboard-cases/index.php accessed Apr. 12, 2013.
iPad Keyboards, Cases, & Stands; Logitech Keyboard Case for iPad 3 & 4; ZAGG Keyboards & Cases; http://www.zagg.com/keyboard-cases/index.php accessed Apr. 12, 2013.
iPad Keyboards, Cases, & Stands; ZAGGkeys FLEX; ZAGG Keyboards & Cases; http://www.zagg.com/keyboard-cases/index.php accessed Apr. 12, 2013.
Ultrathin Keyboard Cover for iPad—Logitech; Ultrathin Keyboard Cover; http://www.logitech.com/en-us/product/ultrathin-keyboard-cover accessed Apr. 12, 2013.
CruxSKUNK—CruxCase; http://www.cruxcase.com/products/cruxskunk/ accessed Apr. 12, 2013.
CruxFLIP—CruxCase; http://www.cruxcase.com/products/cruxflip-3/ accessed Apr. 12, 2013.
Crux360—CruxCase; http://www.cruxcase.com/products/crux360-for-ipad-3 accessed Apr. 12, 2013.
Kickstarter; Brydge+ iPad: Do more. By Brad Leong; http://www.kickstarter.com/projects/552506690/brydge-ipad-do-more?play=1&ref=search accessed Apr. 15, 2013.

* cited by examiner

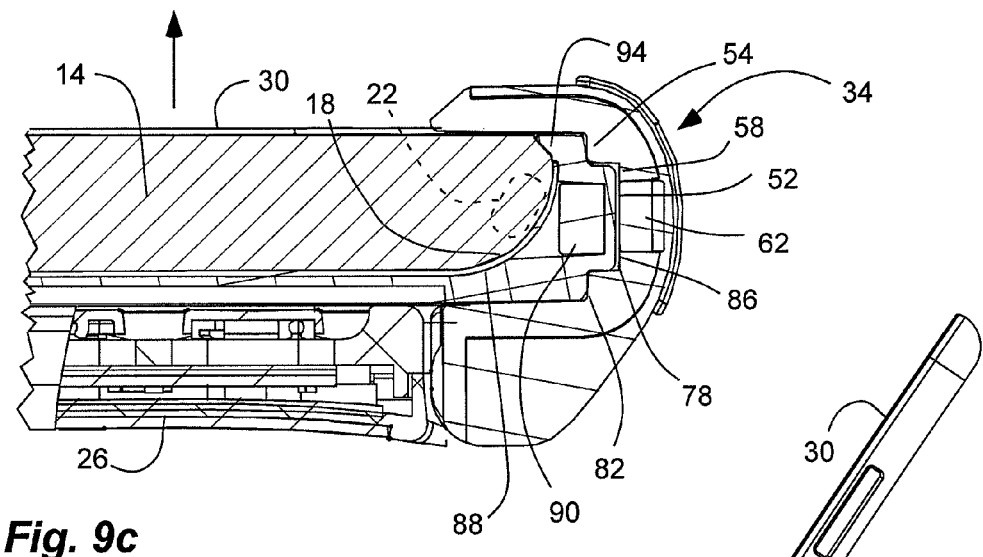
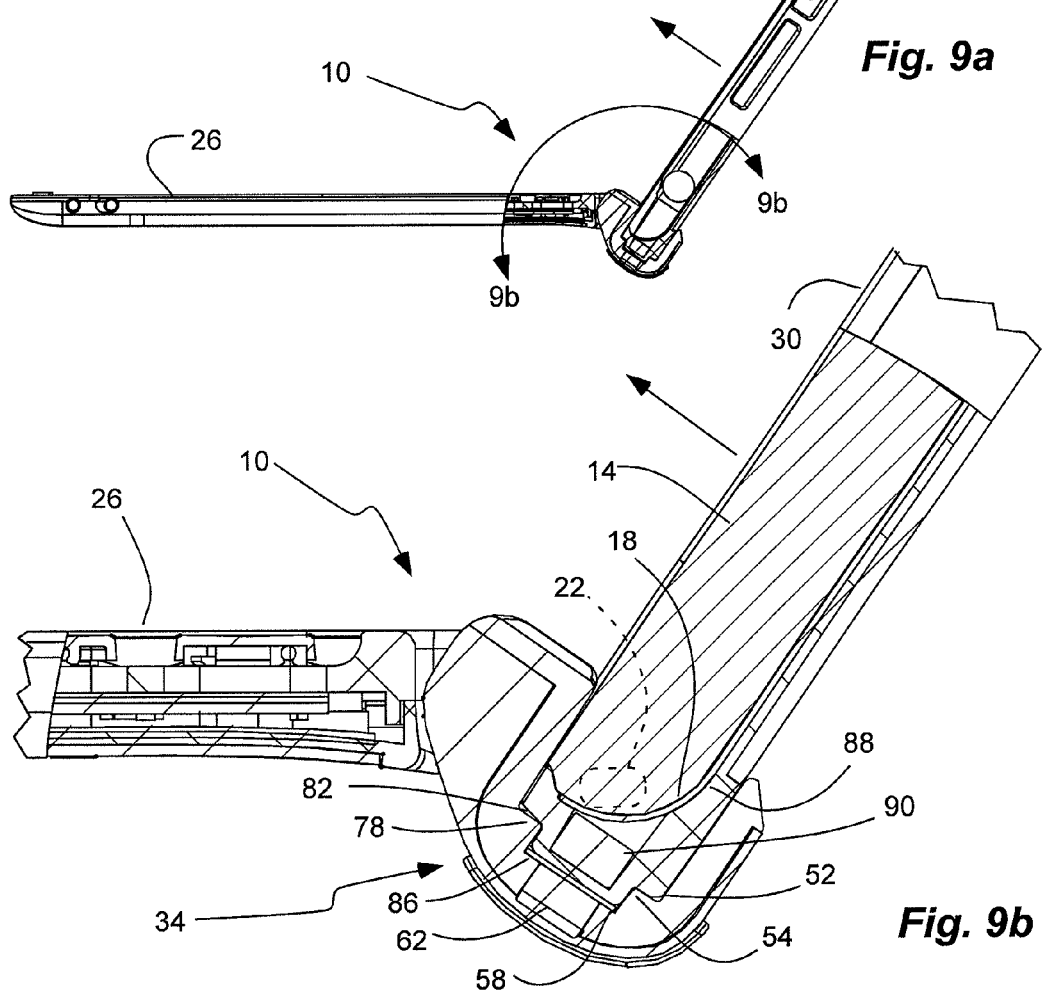
Fig. 9c
Fig. 9a
Fig. 9b

REVERSIBLE FOLIO FOR TABLET COMPUTER WITH REVERSIBLE CONNECTION FOR KEYBOARD AND READING CONFIGURATION

RELATED APPLICATION(S)

This is related to U.S. patent application Ser. No. 13/896,900, filed May 17, 2013, now U.S. Pat. No. 8,599,542; which is hereby incorporated herein by reference.

BACKGROUND

1. Field of the Invention

The present invention relates generally to removable keyboards for tablet computers.

2. Related Art

Tablet computers or tablets, such as the Apple® iPad® tablet computer, have grown in popularity. Such tablet computers are often thin, rectilinear computers with a broad touch screen that can offer media viewing and user input through a graphical keyboard. Such tablet computers can also have a patterned magnet array to magnetically attach to a cover. Such magnetic connection is often a unidirectional connection or only providing a connection in a single direction or orientation.

Tablet computers risk damage from dropping because their small size and light weight promote mobility and holding. Often, the tablet computer has a slim, streamline case that is aesthetically pleasing but difficult to grasp and hold. User's often supplement the tablet computer with a case or folio to protect the screen and the tablet computer. Such cases or folios can often enclose or envelope the back, edges, and front perimeter of the tablet computer. Other cases can grip or pinch the tablet computer.

Typing or keyed entry on the tablet computers can be difficult due to the lack of haptic or tactile response of the graphical keyboard, and the large amount of space required by the graphical keyboard leaves a small viewing area. User's often supplement the tablet computer with a wireless keyboard to facilitate typing or keyed entry. Such wireless keyboards can also be incorporated into the case or folio. Again, such cases or folios can often enclose or envelope the back, edges, and front perimeter of the tablet computer. Alternatively, such keyboards can have a tray to receive the tablet computer thereon Such tablet computers are often used in a landscape orientation (i.e. with the length or longer dimension horizontally oriented) for viewing media. In addition, such tablet computers can be used in a portrait orientation (i.e. with the width or narrower dimension horizontally oriented) for reading text or electronic books. The above described cases and/or keyboards often do not readily lend themselves to prolonged holding or reading, and are often removed by the user for such activity.

SUMMARY OF THE INVENTION

It has been recognized that it would be advantageous to develop a cover, keyboard, stand and/or grip or combination thereof that is capable of providing various different configurations including: a cover configuration to cover the screen, a keyboard configuration to carry the tablet while receiving keystrokes, a stand configuration to hold the screen for viewing, a reading configuration to facilitate grasping and holding the tablet, and/or combinations thereof. In addition, it has been recognized that it would be advantageous to provide a cover, keyboard, stand or grip or combination thereof that is reversibly attachable to the tablet, while accounting for a non-symmetrical profile and/or patterned magnetic array and/or unidirectional connection configuration of the tablet computer.

The invention provides a reversible folio for a tablet computer that has an edge with a non-symmetrical profile and a non-symmetrical patterned magnet array. The reversible folio comprises a leaf being sized and shaped to cover the tablet computer. A channel is pivotally coupled to an edge of the leaf, and has an interior with a symmetrical profile. A first symmetrical magnet array is disposed in and carried by the channel, and has magnets arrayed symmetrically about a longitudinal axis bisecting the leaf. At least a proximal edge is disposed over the edge of the tablet computer, and removably coupled to the channel. An exterior symmetrical profile of the proximal edge is removably received in the channel, and mates with the symmetrical profile of the channel. An interior profile of the proximal edge is sized and shaped to receive and cover the non-symmetrical profile and the non-symmetrical patterned magnet array of the edge of the tablet computer. A second symmetrical magnet array is carried by the proximal edge, and has magnets arrayed symmetrically about a longitudinal axis bisecting the proximal edge in a transverse direction, and reversed with respect to the first symmetrical magnet array of the channel. The proximal edge physically mates with the channel, and the first magnet array of the channel magnetically mates with the second magnet array of the proximal edge, in two opposite orientations facing in opposite orientations.

In addition, the invention provides a reversible folio for a tablet computer having an edge with a non-symmetrical profile and a non-symmetrical patterned magnet array. The reversible folio comprises a keyboard and a channel pivotally coupled to an edge of the keyboard. The channel has an interior with a symmetrical profile. A first symmetrical magnet array is disposed in and carried by the channel, and has magnets arrayed symmetrically about a longitudinal axis bisecting the keyboard. A tablet shell is pivotally and removably coupled to the keyboard. The tablet shell has a back wall and a perimeter wall forming a cavity sized and shaped to removably receive the tablet computer. The tablet shell has a proximal edge with a symmetrical profile removably received in the channel and mating with the symmetrical profile of the channel. A second symmetrical magnet array is carried by the proximal edge of the tablet shell, and has magnets arrayed symmetrically about a longitudinal axis bisecting the tablet shell in a transverse direction, and reversed with respect to the first symmetrical magnet array of the channel. The keyboard and the tablet shell are reversible with respect to one another, and have at least three different configurations with respect to one another, including: 1) a cover configuration in which a keyboard side of the keyboard is closed opposing an interior side of the tablet shell, and in which the tablet shell is magnetically attached to the channel in a first orientation; 2) a keyboard configuration in which the keyboard side of the keyboard and the interior side of the tablet shell are pivoted away from one another at an obtuse angle and exposed for use, and in which the tablet shell is magnetically attached to the channel in the first orientation; and 3) a reading configuration in which the keyboard side of the keyboard is closed opposing a back side of the tablet shell so that the cavity of the tablet shell faces outwardly, and in which the tablet shell is magnetically attached to the channel in a second orientation opposite the first orientation.

Furthermore, the invention provides a reversible folio in combination with a tablet computer having an edge with a non-symmetrical profile and a non-symmetrical patterned magnet array. The reversible folio comprises a tablet shell with a back wall and a perimeter wall forming a cavity removably receiving the tablet computer therein. The tablet shell substantially covers a back, a perimeter, and a front perimeter of an existing housing of the tablet computer. A proximal edge of the tablet shell has a symmetrical profile, different from the non-symmetrical profile of the table computer. A keyboard is pivotally and removably coupled to the tablet shell. A channel is pivotally coupled to an edge of the keyboard. An interior of the channel removably receives the proximal edge of the tablet shell, and has a symmetrical profile mating with the symmetrical profile of the tablet shell. A first symmetrical magnet array is disposed in and carried by the channel, and has magnets arrayed symmetrically about a longitudinal axis bisecting the keyboard. A second symmetrical magnet array is carried by the proximal edge of the tablet shell, and has magnets arrayed symmetrically about a longitudinal axis bisecting the tablet shell, and different than the non-symmetrical patterned magnet array of the tablet computer, and reversed with respect to first patterned magnet array of the channel. The proximal edge of the tablet shell adds the second symmetrical magnet array over the non-symmetrical patterned magnet array of the tablet computer to convert a unidirectional connection of the non-symmetrical patterned magnet array of the table computer to a reversible, multi-directional connection to removably couple the tablet shell, and thus the tablet computer, both physically and magnetically to the channel and the first magnet array of the keyboard. The proximal edge of the tablet shell physically mates with the channel of the keyboard, and second magnet array of the tablet shell magnetically mates with the first magnet array of the channel, in both a first orientation and a second orientation opposite the first orientation. The keyboard and the tablet shell are reversible with respect to one another, and have at least three different configurations with respect to one another, including: 1) a cover configuration in which a keyboard side of the keyboard is closed opposing an interior side of the tablet shell, and in which the tablet shell is magnetically attached to the channel in the first orientation; 2) a keyboard configuration in which the keyboard side of the keyboard and the interior side of the tablet shell are pivoted away from one another at an obtuse angle and exposed for use, and in which the tablet shell is magnetically attached to the channel in the first orientation; and 3) a reading configuration in which the keyboard side of the keyboard is closed opposing a back side of the tablet shell so that the interior side of the tablet shell faces outwardly, and in which the tablet shell is magnetically attached to the channel in the second orientation opposite the first orientation.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 9*a* is a is a side view of the reversible folio of FIG. 1 with a partial cut away or cross-section;

FIG. 9*b* is a partial detailed side view of the reversible folio of FIG. 1, shown in the keyboard configuration and the first orientation;

FIG. 9*c* is a partial detailed side view of the reversible folio of FIG. 1, shown in the reading configuration and the second orientation;

Figure 1:
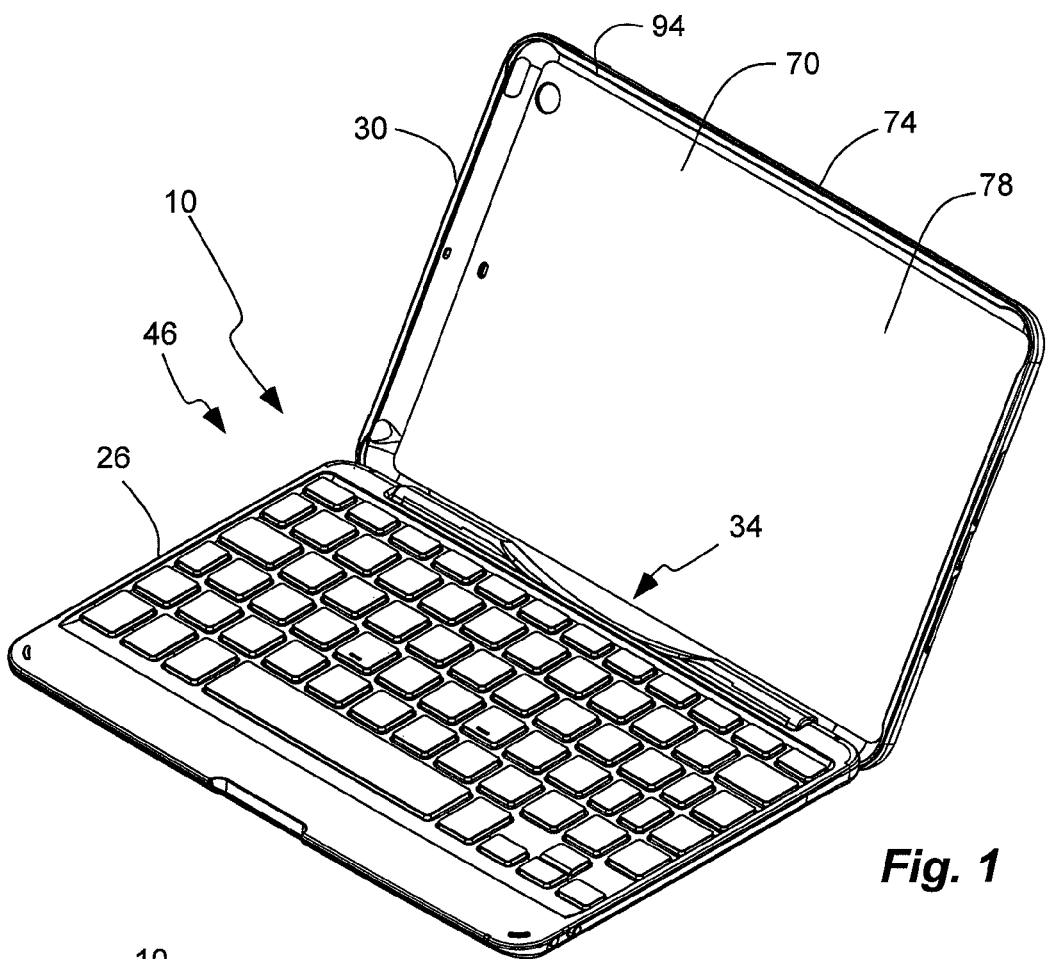
FIG. 1 is a perspective view of a reversible folio in accordance with an embodiment of the present invention, shown in a keyboard configuration, and with a tablet leaf or shell coupled to a keyboard or keyboard leaf in a first orientation, and with a tablet computer removed from the tablet leaf or shell.
Figure 2:
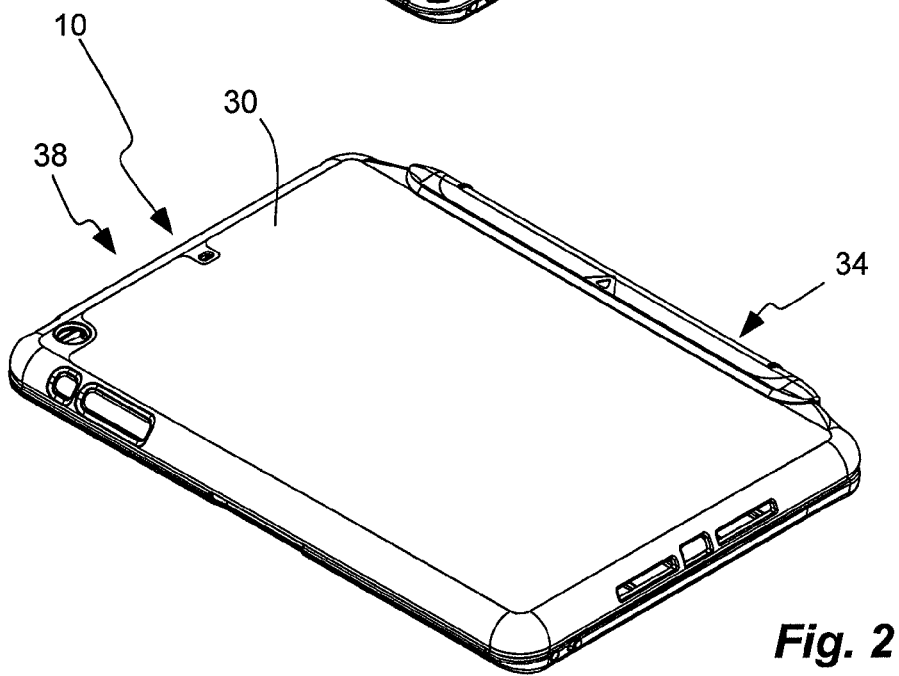
FIG. 2 is perspective view of the reversible folio of FIG. 1, shown in a cover configuration, and with the tablet leaf or shell coupled to the keyboard or keyboard leaf in the first orientation.
Figure 3:
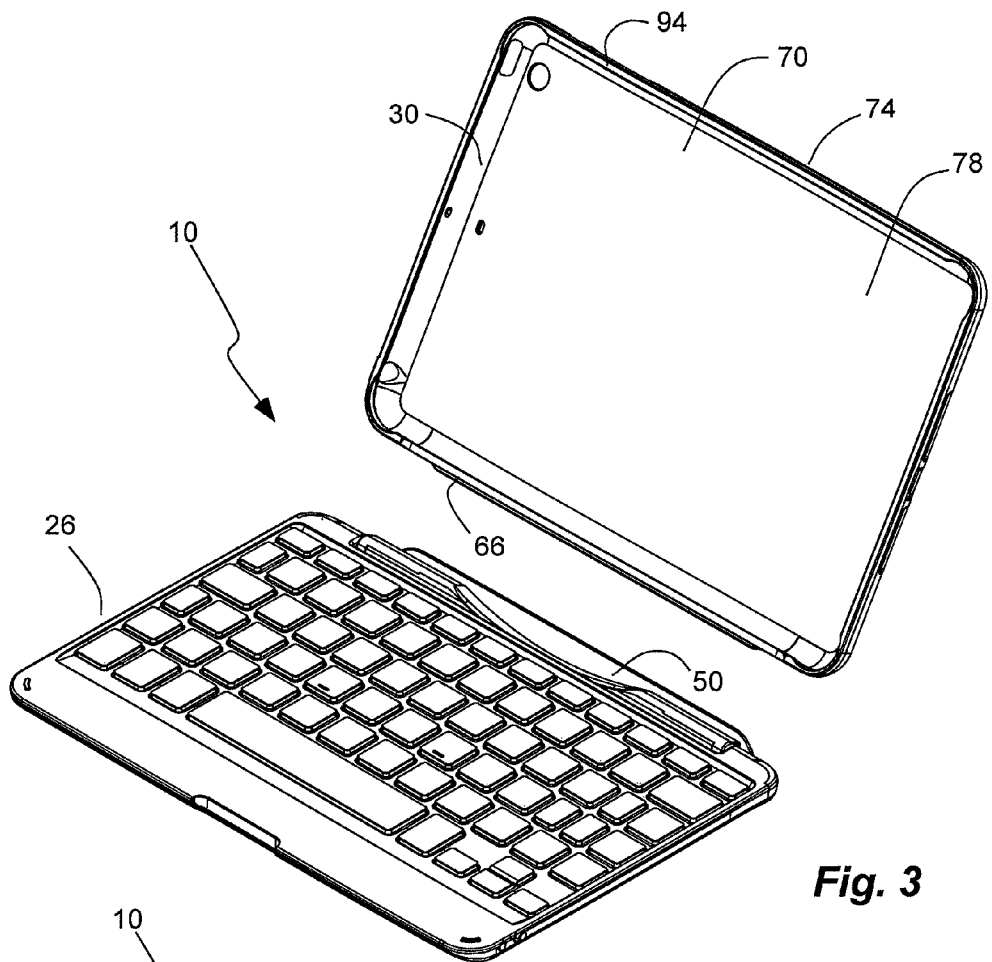
FIG. 3 is an exploded perspective view of the reversible folio of FIG. 1, shown with the tablet leaf or shell removed from the keyboard or keyboard leaf, and with the tablet computer removed from the tablet leaf or shell.
Figure 4:
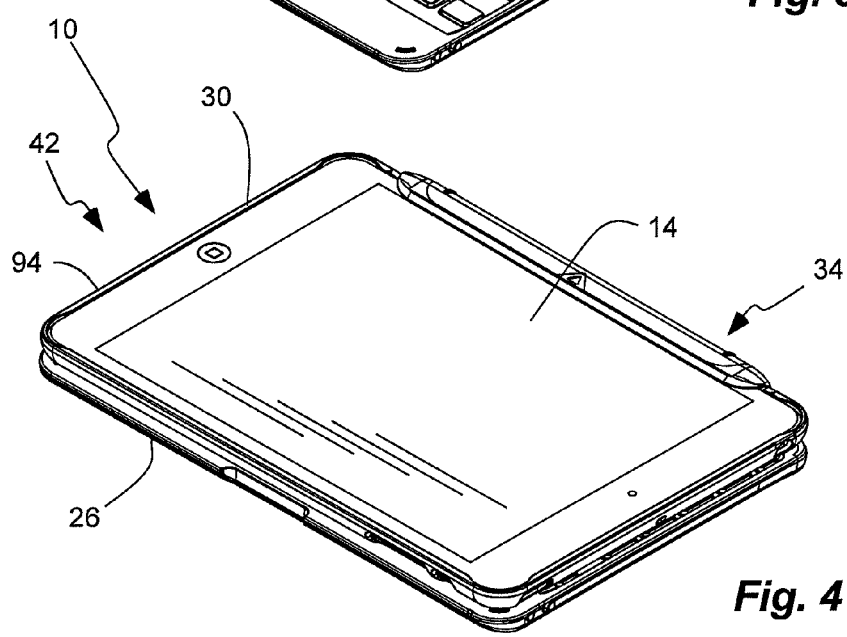
FIG. 4 is a perspective view of the reversible folio of FIG. 1, shown in a reading configuration, and with the tablet leaf or shell coupled to the keyboard or keyboard leaf in a second orientation, opposite that of the first orientation, and with a tablet computer carried by the tablet leaf or shell.
Figure 5:
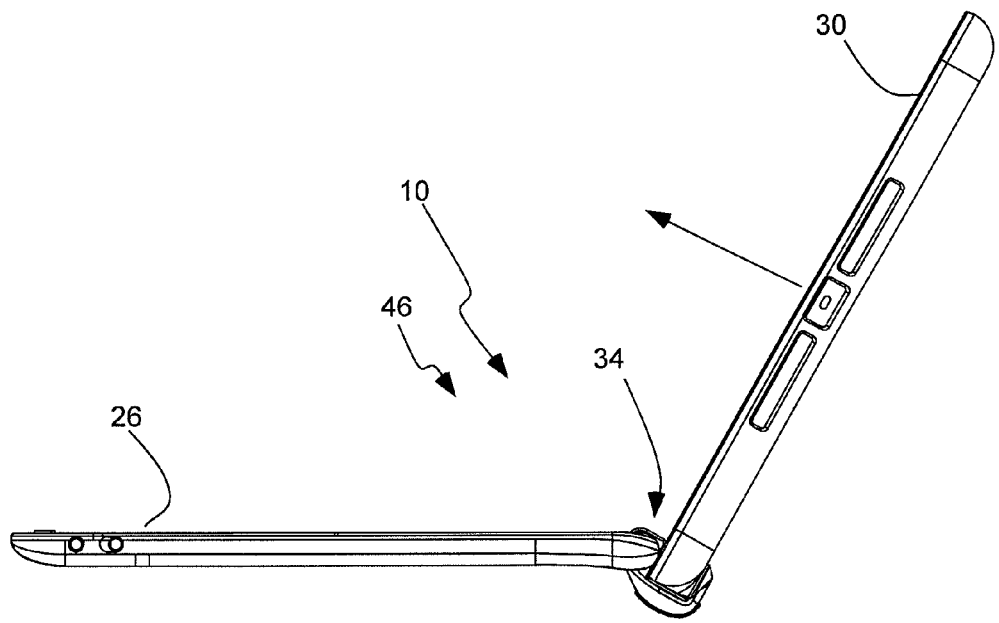
FIG. 5 is a side view of the reversible folio of FIG. 1, shown in the keyboard configuration and the first orientation.
Figure 6:
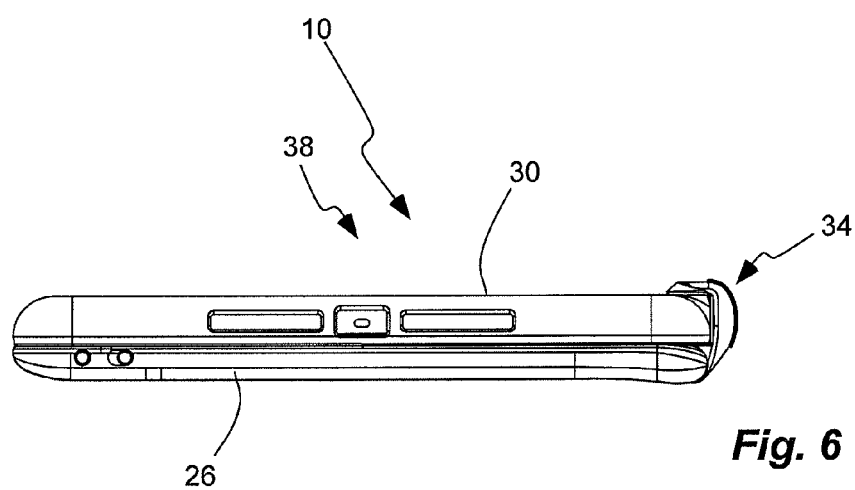
FIG. 6 is a side view of the reversible folio of FIG. 1, shown in the cover configuration and the first orientation.
Figure 7:
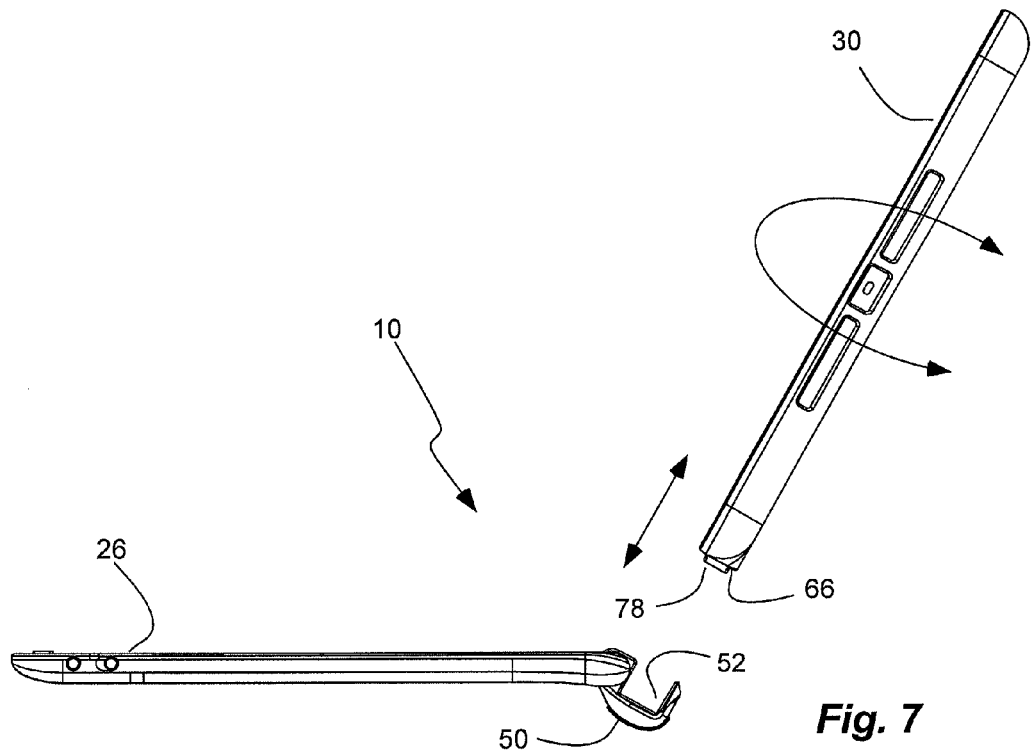
FIG. 7 is an exploded side view of the reversible folio of FIG. 1.
Figure 8:
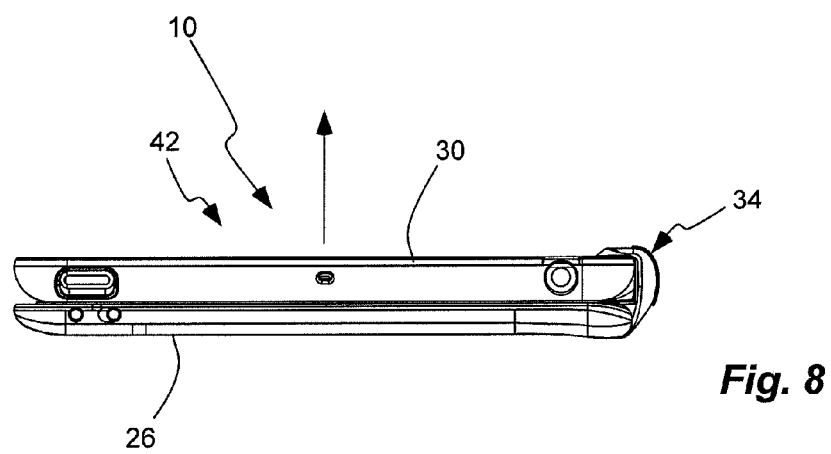
FIG. 8 is a side view of the reversible folio of FIG. 1, shown in the reading configuration and the second orientation.
Figure 10:
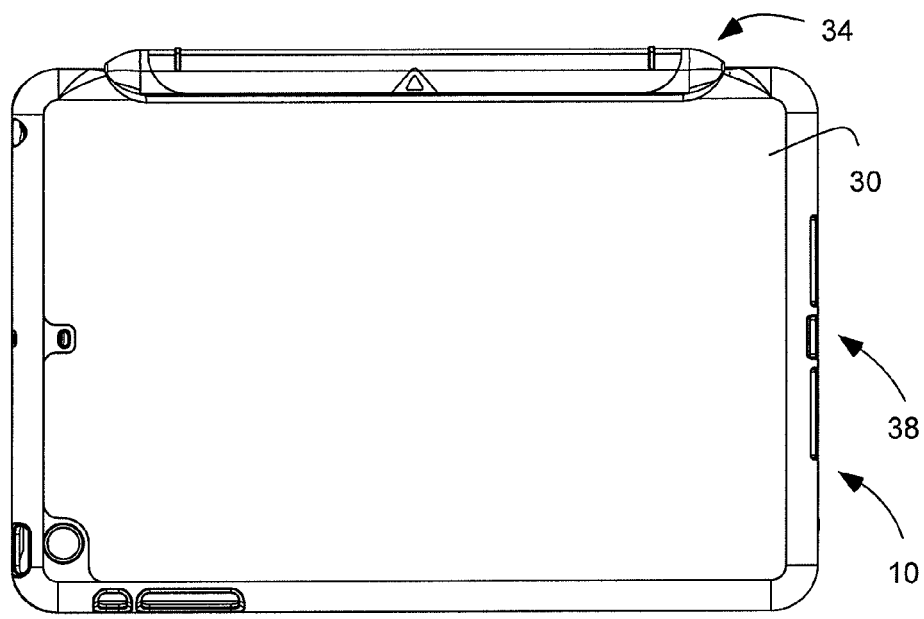
FIG. 10 is a top view of the reversible folio of FIG. 1, shown in the cover configuration.
Figure 11:
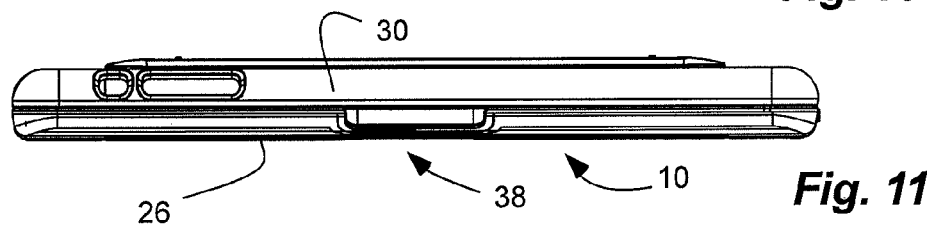
FIG. 11 is a front view of the reversible folio of FIG. 1, shown in the cover configuration.
Figure 12:
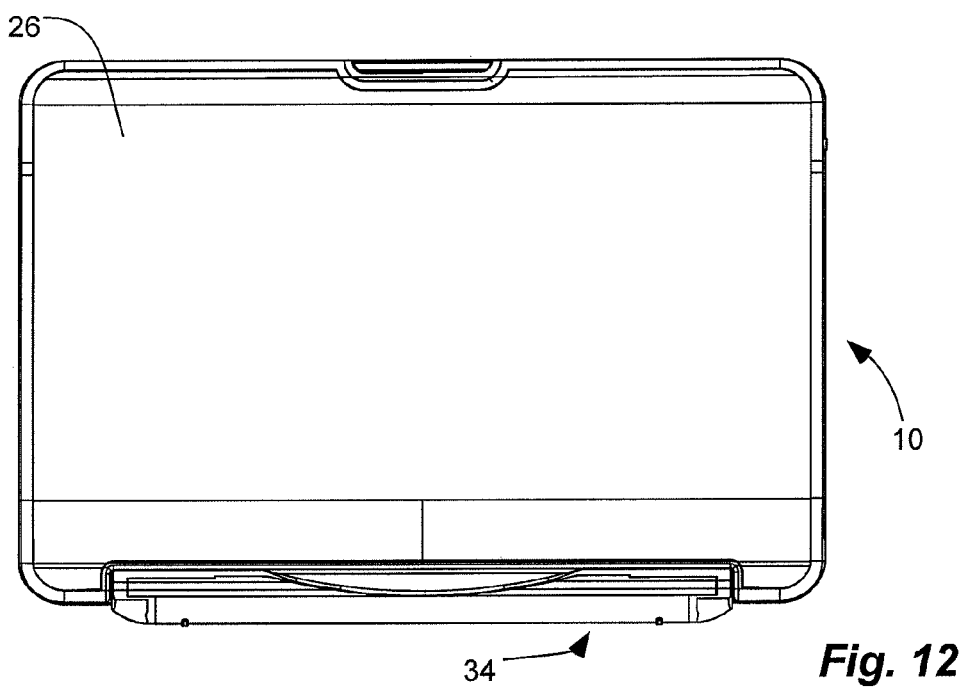
FIG. 12 is a bottom view of the reversible folio of FIG. 1.
Figure 13:
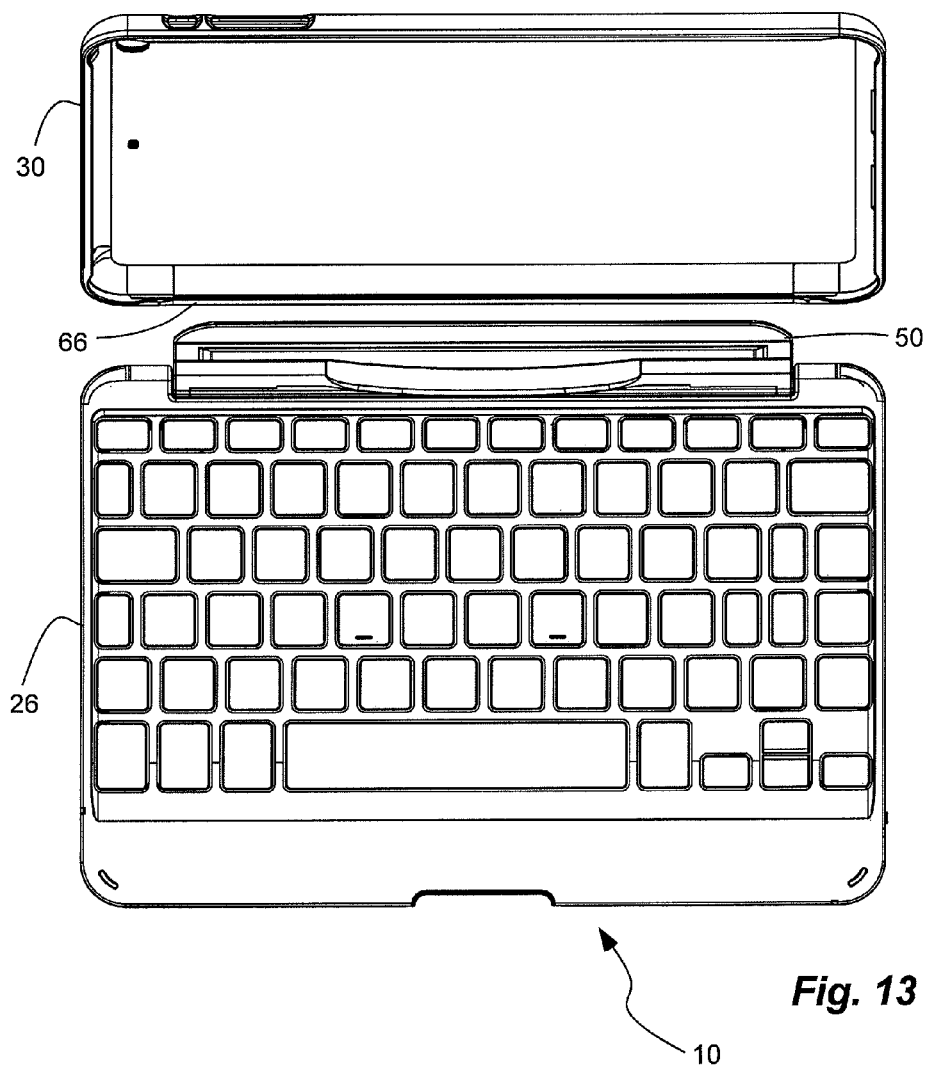
FIG. 13 is an exploded top view of the reversible folio of FIG. 1.
Figure 14:
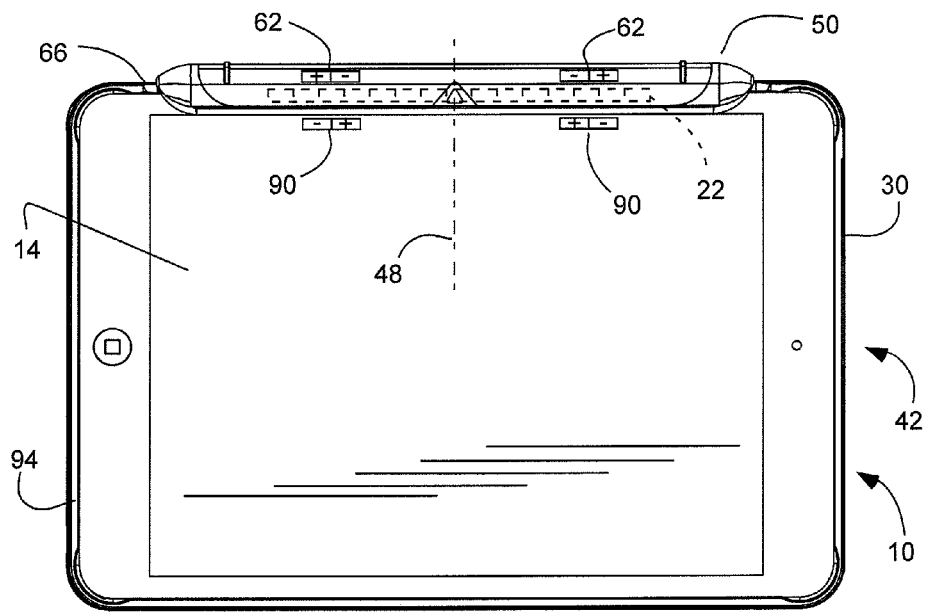
FIG. 14 is a schematic view of the reversible folio of FIG. 1 and the tablet computer in the reading configuration and the second orientation.
Figure 15:
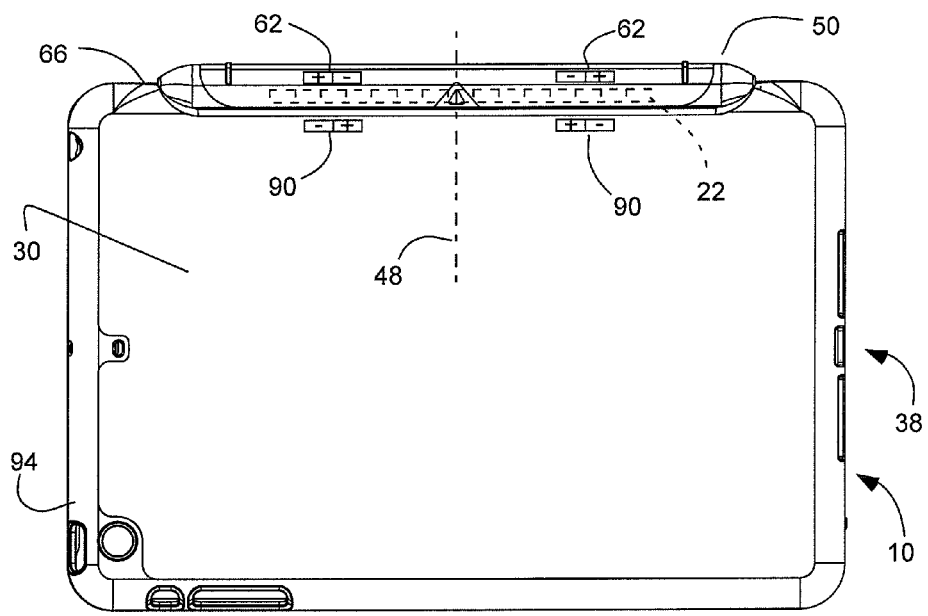
FIG. 15 is a schematic view of the reversible folio of FIG. 1 and the tablet computer in the cover configuration and the first orientation.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENT(S)

Definitions

The terms "tablet computer" and "tablet" are used interchangeably herein to refer to a computer or multi-media device that is one-piece with a screen and that is portable and handheld. Examples of tablets include the Apple™ iPad™, the Samsung™ Galaxy™ Tab™, etc. The screen can be a touch screen that can receive input by touch, such as finger swipes, and/or can have a virtual keyboard. The tablet can be wide (or broad) and thin. For example, the screen can have a diagonal length greater than 7 inches, and a thickness less than a ¼-½ inch. The tablet can have a battery and memory and a processor with software running thereon. The tablet can have WiFi and Bluetooth connectivity. Thus, the tablet can provide internet browsing, game playing, movie and picture display, e-book display, etc. In addition, the tablet can include a digital camera.

The term "patterned magnet array" refers to an array of magnets with their polarity or poles oriented in a pattern. The array can be linear, and the pattern can include a series of magnets with alternating polarity or poles. In addition, the magnets can be paired or grouped, with individual magnets, or pairs or groups of magnets, spaced-apart from one another. Another second magnet array with a reverse pattern can be aligned with the first magnet array to magnetically attach the magnet arrays together, with reverse polarity or poles of the magnets in the arrays attracting one another. The pattern can be configured to be asymmetrical so that the magnet arrays have only a single desired magnetical attachment or a single desired orientation of one magnet array with respect to the other.

The term "symmetrical magnet array" refers to magnets arrayed symmetrically about an axis so that first and second magnet arrays can be magnetically coupled together in both first and second opposite or reverse orientations. In addition, the first and second magnet arrays are intended to include both a pair of mating magnet arrays, and a single magnet array and an array of ferromagnetic material that are also capable of mating. Thus, one magnet array can be magnetic, will another magnet array can be ferromagnetic.

The terms "friction fit" and "interference fit" are used to describe a connection in which the matching or mating between components is configured to have greater than normal friction and/or interference.

Description

As illustrated in FIGS. 1-17, a reversible folio, indicated generally at 10, in an example implementation in accordance with the invention is shown for use with a tablet computer or tablet 14. The folio can provide protection to the tablet and its screen, and can provide a keyboard, and can provide multiple reverse and opposite orientations of the tablet and the keyboard to facilitate typing, reading and viewing. The tablet computer 14 can have an edge with a patterned magnet array that provides a unidirectional connection with a cover, or a connection that has only one direction or orientation. The reversible folio 10 has a pair of leafs, such as a keyboard leaf or keyboard 26 and a tablet leaf or shell 30, that are pivotally coupled together at a reversible connection 34. In addition, the pair of leafs are removably coupled together so that they can be separated from one another. Furthermore, the pair of leafs are reversibly couplable to one another in two opposite orientations so that the tablet leaf or shell can face in opposite orientations with respect to the keyboard leaf. The tablet leaf or shell convert the unidirectional connection of the non-symmetrical patterned magnet array of the tablet to a reversible, multi-directional connection 34 with the keyboard or keyboard leaf by adding a symmetrical magnet array over the non-symmetrical patterned magnet array of the tablet, and a symmetrical profile over the non-symmetrical profile of the tablet.

Figure 16:
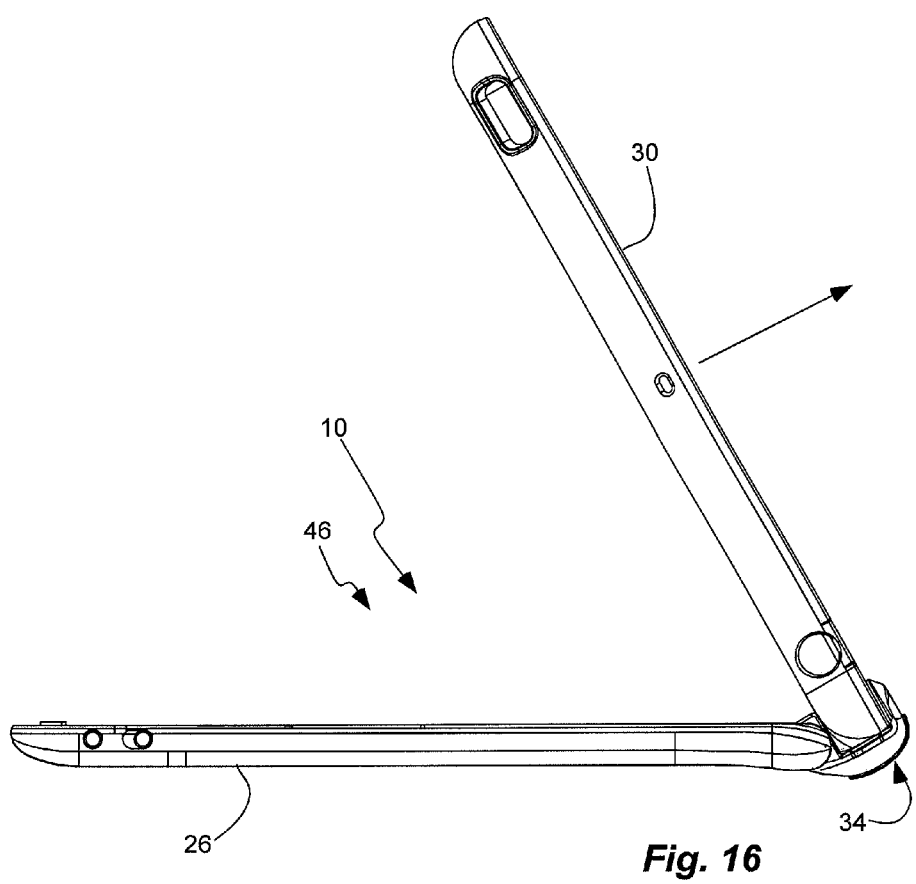
FIG. 16 is a side view of the reversible folio of FIG. 1, shown in a stand configuration and the second orientation.
Figure 17:
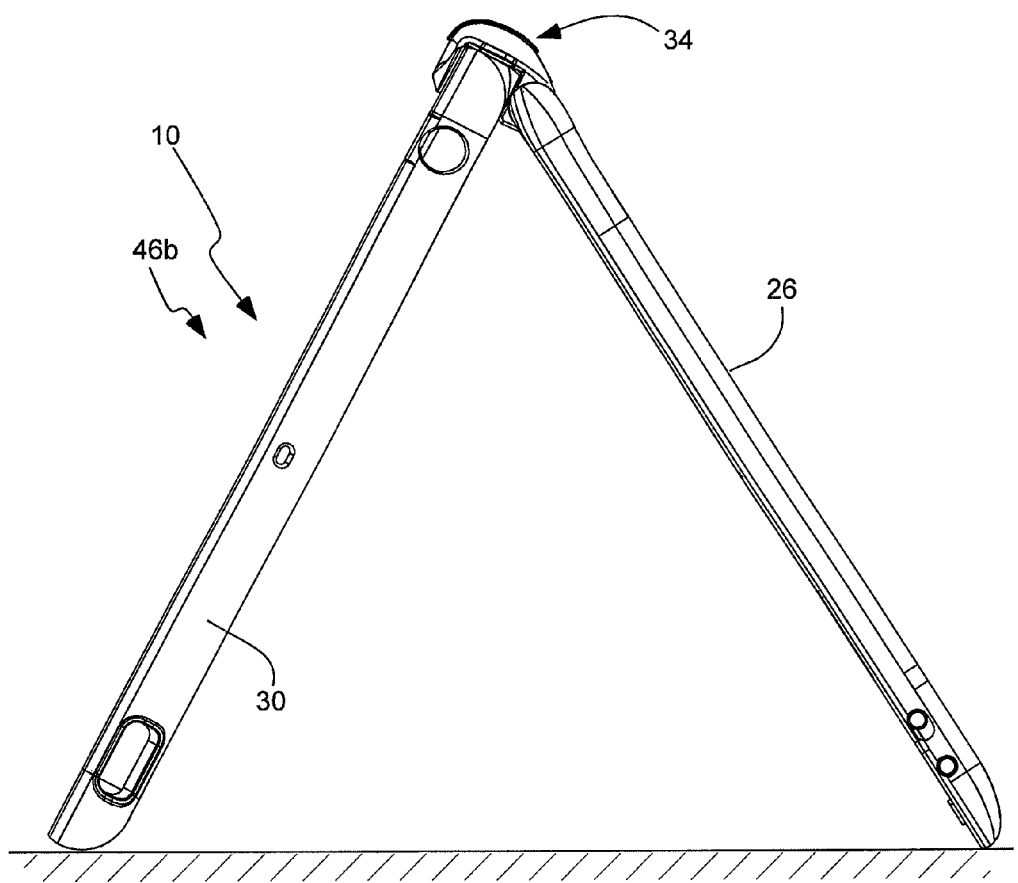
FIG. 17 is a side view of the reversible folio of FIG. 1, shown in another stand configuration and the second orientation.

Thus, the reversible folio 10 can include a reversible connection 34 to reversibly connect the keyboard and tablet in two opposite configurations or orientations, such as a cover configuration 38 (FIGS. 2, 6, 10, 11 and 16) and a reading configuration 42 (FIGS. 4, 8, 9c and 14), or a keyboard configuration 46 (FIGS. 1, 5, 9a and 9b) and the reading configuration. The cover and keyboard configurations 38 and 46 can be first configurations or orientations, while the reading configuration 42 can be a second configuration or orientation. The reversible folio 10 and/or connection can also support a stand configuration 46 (FIG. 16 or 17). The reading and stand configurations 42 and 46 can be second configurations or orientations. Thus, the reversible folio or connection can releasably connect or attach the keyboard or keyboard leaf 26 to the tablet 14 or shell 30 in the first configuration to protect the screen of the tablet and/or the keyboard in the cover configuration 38, or allow typing or keyed entry on the keyboard in the keyboard configuration 46; and in the second, opposite configuration to fold the keyboard or keyboard leaf behind the tablet in the reading configuration 42, or allow viewing the screen of the tablet in the stand configuration 46. Thus, the reversible folio can both protect the tablet or screen thereof, and fold out of the way or add thickness to the tablet to facilitate grasping and holding in the reading configuration. In addition, the reversible folio can both provide the keyboard in the keyboard configuration, and fold out of the way or add thickness to the tablet to facilitate grasping and holding in the reading configuration. Furthermore, the reversible folio can support the tablet for viewing in the stand configuration. The reversible folio 10 and/or reversible connection 34 can provide or support the two opposite configurations or orientations despite the tablet computer 8 having the edge with the non-symmetrical profile 18 and the non-symmetrical patterned magnet array 22.

The reversible connection 34 of the reversible folio 10 can reversibly connect to the tablet 8 and shell 30 to the keyboard 26 so that the keyboard and the screen can face one another (or oppose or abut to one another) in the cover configuration to protect both the screen and the keyboard with the cover closed opposing the a screen side of the tablet; expose both the keyboard and screen in the keyboard configuration for both visibility and keyboarding with the cover and the screed side of the tablet pivoted away from one another at an obtuse angle and exposed for use; expose the screen of the tablet while protecting the keyboard in the reading configuration with the keyboard facing (or closed opposing) the back of the shell; and protect the keyboard in the stand configuration.

The reversible folio 10 can have at least one leaf and at least one proximal edge. The at least one leaf can be first leaf, or the keyboard leaf or keyboard 26. The reversible folio can include a pair of leafs, including a second leaf, which can be the tablet leaf or shell 30. The tablet leaf or shell can removably receive and carry the tablet. The keyboard can be or can define a cover to the tablet, while the tablet leaf or shell can define a cover to the keyboard. The at least one proximal edge can be an edge of the tablet leaf or shell 30 that is proximal the keyboard. The leaf(s) can be sized and shaped similar to the tablet to cover the tablet. The reversible folio 10, and/or the keyboard 26 and the tablet leaf or shell 30, can have a longitudinal axis 48 (FIGS. 14 and 15) that bisects the keyboard and the shell (the leafs thereof, a channel discussed below, and the proximal edge), and that is transverse to the keyboard and the shell (the leafs thereof, the channel, and the proximal edge). The keyboard 26 can be a panel with a back or bottom side, and front or keyboard side with the keyboard. The keyboard, leaf and/or panel can have a size and shape that substantially matches that of the tablet. The keyboard can have a plurality of keys that can be touched by a user. The keys can be touch sensitive and can physically displace or provide other haptic or tactile feedback to the user's fingers. The keyboard, leaf and/or panel can include a wireless transmitter to transmit the keystrokes to the tablet (and to be received by a wireless receiver of the tablet). The wireless transmitter can use a short-wave radio transmission with the Bluetooth™ standard. The keyboard, leaf or panel can include a rechargeable battery and a connection port to allow the battery to be recharged. The keyboard, leaf or panel can also include a light source or indicator, such as an LED, to indicate the power status of the keyboard, and/or to illuminate the keys.

The reversible connection 34 and/or reversible folio 10 has a channel 50 to removably receive the proximal edge of the tablet leaf or shell 30 therein in opposite first and second orientations. The channel 50 can be pivotally coupled to the keyboard, leaf and/or panel 26.

The channel 50 can be pivotally coupled to a rear or back edge of the keyboard. In addition, the channel can be elongated, but with a length less than a length of the edge of the keyboard. The rear or back edge of the keyboard can have a notch to receive a portion of the channel therein. The notch can be disposed between opposite tabs or flanges at the back of the cover. Thus, the cover or tabs or flanges can enclose or overlap the ends of the channel. The channel 50 can have opposite sides and a channel bottom that extend along a length thereof or along a longitudinal axis of the channel. The channel 50 or one of the sides thereof can be disposed in the notch between the tabs or flanges. The channel 50 can pivot about a pivot axis extending between the tabs or flanges of the cover, and the lateral side of the channel. Thus, the channel pivots about one of the lateral sides thereof. The channel and/or pivot can form or be part of a hinge, such as a resistance hinge, that can hold its relative position until forced to change, as known in the art. Thus, the hinge can maintain the orientation of the leafs with respect to one another in an open or in-use configuration, or the closed configuration. The channel 50 can have an elongated interior or hollow to removably receive at least a portion of the proximal edge of the tablet leaf or shell. The channel can have an interior or interior profile 52 (cross-sectional profile perpendicular or normal to a longitudinal axis or length of the channel) that is symmetrical and different than the non-symmetrical profile of the edge profile of the tablet (again a cross-sectional profile perpendicular or normal to a length of the edge). As described above, the edge profile of the tablet can be asymmetrical. For example, one side of the edge of the table can have a larger radius, bevel or chamfer than an opposite side. The interior profile of the channel, however, is symmetrical. The interior of the channel can have a stepped profile, with the interior of the channel having a narrower channel 58 within a wider channel 54, as shown in FIGS. 9b and 9c. The narrower channel can define an elongated slot that has opposite closed ends to laterally retain a narrower tab, as described below.

The channel 50, or the connection 34 or folio 10, also has a first magnet array 62 to magnetically attach to the proximal edge of the tablet leaf or shell, as opposed to a patterned magnet array 22 of the edge of the tablet computer 8. The first magnet array is disposed in and carried by the channel. The first magnet array 62 can be recessed in the bottom of the channel. The first magnet array is symmetrical and has magnets arrayed symmetrically about the longitudinal axis 48 bisecting the keyboard, leaf and/or panel. The first magnetic array 62 of the channel is reverse or opposite that of the tablet leaf or shell, and oriented to attach to the tablet leaf or shell in either of the opposite first and second orientations.

As described above, the reversible folio 10 can have a pair of leafs, including a second leaf that can be the tablet leaf or shell 30 which includes the proximal edge 66. The second leaf or tablet leaf 30 is pivotally and removably coupled to the first leaf or keyboard leaf 26 by the proximal edge 66 thereof. The tablet leaf or shell 30 has a back wall 70 and a perimeter wall 74 forming a cavity 78 sized and shaped to removably receive the tablet computer 8 therein and defining a shell to substantially cover a back, a perimeter and a front perimeter of an existing housing of the tablet computer. The back wall 70 can substantially cover a back of the tablet computer, and the perimeter wall 74 can substantially circumscribe a perimeter of the tablet computer. The back wall and perimeter wall can cover a majority of the back and perimeter of the tablet, but with openings or cut outs to accommodate buttons, inputs/outputs, microphones, cameras, speakers, power connectors, etc.

The tablet shell 30, or proximal edge 66 thereof, is removably coupled to the channel 50 and the tablet computer. The proximal edge 66 of the tablet shell 30, or exterior thereof, has an exterior symmetrical profile 78 different from the non-symmetrical profile 18 (FIGS. 9b and 9c) of the table computer 8. The exterior symmetrical profile 78 of the proximal edge is removably received in the channel 50, and mates with the symmetrical profile 52 of the channel. The exterior or exterior profile 78 of the proximal edge can be or can have a stepped profile, with the proximal edge having a narrower tab 86 on a wider tab 82. The narrower tab 86 can extend into the narrower channel 58 or slot of the channel, and can be laterally retained therein by its closed ends. An interior profile 88 (FIGS. 9b and 9c) of the proximal edge 66 can be sized and shaped to receive and cover the non-symmetrical profile 18, and the non-symmetrical patterned magnet array 22, of the edge of the tablet computer 8. The interior profile 88 of the proximal edge 66 can substantially mate and/or match the non-symmetrical profile 18 of the tablet.

A second symmetrical magnet array 90 is carried by the proximal edge 66 of the shell 30. The second magnet array 90 is symmetrical and has magnets arrayed symmetrically about the longitudinal axis 48 (FIGS. 14 and 15) bisecting the proximal edge in a transverse direction. In addition, the second magnet array 90 is reversed with respect to the first symmetrical magnet array 62 of the channel 50. Thus, the proximal edge 66 of the shell 60 is removably retained in the channel 50 of the keyboard or keyboard leaf 26 by a magnetical force between the first magnet array 62 of the channel and the second magnet array 90 of the proximal edge 66. In addition, the proximal edge 66 of the shell 60 can further be removably retained in the channel 50 of the keyboard or keyboard leaf 26 by a friction fit or interference fit between the interior of the channel and an exterior of the proximal edge. Furthermore, the proximal edge 66 of the shell 30 physically mates with the channel 50 of the keyboard 26, and the first magnet array 62 of channel 50 magnetically mates with the second magnet array 90 of the proximal edge 66, in two opposite orientations facing in opposite orientations. As described above, the keyboard or keyboard leaf 26 and the tablet leaf or shell 30 are reversible with respect to one another, and have at least three different configurations with respect to one another, including: a cover configuration 38 (FIGS. 2, 6, 10, 11 and 15), a keyboard configuration 46 (FIGS. 1, 5, 9a and 9b), and a reading configuration 42 (FIGS. 4, 8, 9c and 14). In the cover configuration 38, a keyboard side of the keyboard or keyboard leaf 26 is closed opposing an interior side of the tablet leaf or shell 30, and the tablet leaf or shell 30 is magnetically attached to the channel 50 in a first orientation, as shown in FIGS. 2, 6, 10, 11 and 15. In the keyboard configuration 46, the keyboard side of the keyboard or keyboard leaf 26 and the interior side of the tablet leaf or shell 30 are pivoted away from one another at an obtuse angle and exposed for use, and the tablet leaf or shell 30 is magnetically attached to the channel 50 in the first orientation, as shown in FIGS. 1, 5, 9a and 9b. In the reading configuration 42, the keyboard side of the keyboard or keyboard leaf 26 is closed opposing a back side of the tablet leaf or shell 30 so that the interior side of the tablet leaf or shell faces outwardly, and the tablet leaf or shell 30 is magnetically attached to the channel 50 in an opposite second orientation opposite the first orientation.

In addition, the keyboard or keyboard leaf 26 can have at least four different configurations with respect to the tablet leaf of shell 30, further including a stand configuration 46 (FIG. 16) in which the keyboard or keyboard leaf 26 and the tablet leaf or shell 30 are pivoted away from one another with a bottom of the keyboard leaf 26 disposed on a support surface, and the back side of the tablet leaf or shell 30 oriented at an acute angle with respect to the keyboard or keyboard leaf, and in which the tablet leaf or shell 30 is magnetically attached to the channel 50 in the opposite second orientation. Alternatively, the folio 10 can have a stand configuration 46b (FIG. 17) in which the keyboard or keyboard leaf 26 and the tablet leaf or shell 30 are oriented with respect to one another as described above in the second orientation, but with the distal ends or edges of the keyboard or keyboard leaf and the tablet leaf or shell disposed on the support surface in a tent configuration.

The tablet shell or leaf 30, or second leaf, can comprise or be formed of a flexible and resilient material. In addition, the perimeter wall 74 can be sized to provide a snap fit with the tablet computer. The perimeter wall 74 of the shell can include an inwardly projecting lip 94 substantially circumscribing the cavity 78 and having an interior opening defined between the projecting lip around the cavity that can be smaller than a perimeter of the tablet computer 8. Thus, the tablet can be press-fit or snap-fit into the shell to be retained therein by the lip. The tablet computer 8 is removably coupled to the tablet shell or leaf 30, and the proximal edge 66 thereof.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A reversible folio device configured for a tablet computer having an edge with a non-symmetrical profile and a non-symmetrical patterned magnet array, the device comprising:
   a) a first leaf sized and shaped to cover the tablet computer;
   b) a channel pivotally coupled to an edge of the first leaf and having an interior with a symmetrical profile;
   c) a first symmetrical magnet array disposed in and carried by the channel and having magnets arrayed symmetrically about a longitudinal axis bisecting the first leaf;
   d) at least a proximal edge of a second leaf having a cavity sized and shaped to receive the tablet computer, and removable coupled to the channel;
   e) an exterior symmetrical profile of the proximal edge removably received in the channel and mating with the symmetrical profile of the channel;
   f) an interior profile of the proximal edge sized and shaped to receive and cover the non-symmetrical profile and the non-symmetrical patterned magnet array of the edge of the tablet computer;
   g) a second symmetrical magnet array carried by the proximal edge and having magnets arrayed symmetrically about a longitudinal axis bisecting the proximal edge in a transverse direction and reversed with respect to the first symmetrical magnet array of the channel; and
   h) the proximal edge physically mating with the channel, and the first magnet array of the channel magnetically mating with the second magnet array of the proximal edge, in two opposite orientations.

2. The device in accordance with claim 1, wherein the proximal edge adds the second symmetrical magnet array over the non-symmetrical patterned magnet array of the tablet computer to convert a unidirectional connection of the non-symmetrical patterned magnet array of the tablet computer to a reversible, multi-directional connection removably coupled both physically and magnetically to the channel and the first magnet array thereof.

3. The device in accordance with claim 1, wherein the proximal edge overlaps the edge of the tablet computer to convert the non-symmetrical profile and the non-symmetrical patterned magnet array of the edge of the tablet computer to the symmetrically profile and the second symmetrical magnet array of the proximal edge.

4. The device in accordance with claim 1, wherein both an interior of the channel and an exterior of the proximal edge have a stepped profile, with the interior of the channel having a narrower channel within a wider channel, and with the proximal edge having a narrower tab on a wider tab.

5. The device in accordance with claim 4, wherein the narrower channel defines an elongated slot that has opposite closed ends to laterally retain the narrower tab.

6. The device in accordance with claim 1, wherein the first leaf further comprises: a keyboard.

7. The device in accordance with claim 1, wherein the second leaf pivotally and removably coupled to the first leaf by the proximal edge thereof, the second leaf having a back wall and a perimeter wall forming the cavity sized and shaped to removably receive the tablet computer therein.

8. The device in accordance with claim 1, wherein the second leaf pivotally and removably coupled to the first leaf, the second leaf having a back wall and a perimeter wall forming the cavity sized and shaped to removably receive the tablet computer therein, and defining a shell to substantially cover a back, a perimeter and a front perimeter of an existing housing of the tablet computer.

9. The device in accordance with claim 1, further comprising:
   a) a keyboard coupled to the first leaf and defining a keyboard leaf;
   b) the second leaf pivotally and removably coupled to the first leaf by the proximal edge thereof and defining a tablet leaf; and
   c) the keyboard leaf and the tablet leaf being reversible with respect to one another and having at least three different configurations with respect to one another, including:
      i) a cover configuration in which a keyboard side of the keyboard leaf is closed opposing an interior side of the tablet leaf, and in which the tablet leaf is magnetically attached to the channel in a first orientation;
      ii) a keyboard configuration in which the keyboard side of the keyboard leaf and the interior side of the tablet leaf are pivoted away from one another at an obtuse angle and exposed for use, and in which the tablet leaf is magnetically attached to the channel in the first orientation; and
      iii) a reading configuration in which the keyboard side of the keyboard leaf is closed opposing a back side of the tablet leaf so that the interior side of the tablet leaf faces outwardly, and in which the tablet leaf is magnetically attached to the channel in a second orientation opposite the first orientation.

10. A device in accordance with claim 9, further comprising the keyboard leaf having at least four different configurations with respect to the tablet leaf, further including:

a stand configuration in which the keyboard leaf and the tablet leaf are pivoted away from one another with a bottom of the keyboard leaf disposed on a support surface and the back side of the tablet leaf oriented at an acute angle with respect to the keyboard leaf, and in which the tablet leaf is magnetically attached to the channel in the second orientation.

11. The device in accordance with claim 1, further comprising the second leaf defining a shell with the cavity configured to receive the tablet computer, and with a back wall configured to substantially cover a back of the tablet computer, and a perimeter wall configured to substantially circumscribe a perimeter of the tablet computer.

12. The device in accordance with claim 11, wherein the second leaf comprises a flexible and resilient material, and wherein the perimeter wall of the shell is sized to provide a snap fit with the tablet computer.

13. The device in accordance with claim 12, wherein the perimeter wall of the shell includes an inwardly projecting lip substantially circumscribing the cavity and having an interior opening defined between the projecting lip configured to be smaller than a perimeter of the tablet computer.

14. The device in accordance with claim 1, wherein the proximal edge is removably retained in the channel of the first leaf by a magnetical force between the first magnet array of the channel and the second magnet array of the proximal edge.

15. A reversible folio device configured for a tablet computer having an edge with a non-symmetrical profile and a non-symmetrical patterned magnet array, the device comprising:
   a) a keyboard;
   b) a channel pivotally coupled to an edge of the keyboard and having an interior with a symmetrical profile;
   c) a first symmetrical magnet array disposed in and carried by the channel and having magnets arrayed symmetrically about a longitudinal axis bisecting the keyboard;
   d) a tablet shell pivotally and removably coupled to the keyboard, the tablet shell having a back wall and a perimeter wall forming a cavity sized and shaped to removably receive the tablet computer;
   e) the tablet shell having a proximal edge with a symmetrical profile removably received in the channel and mating with the symmetrical profile of the channel;
   f) a second symmetrical magnet array carried by the proximal edge of the tablet shell and having magnets arrayed symmetrically about a longitudinal axis bisecting the tablet shell in a transverse direction and reversed with respect to the first symmetrical magnet array of the channel;
   g) the keyboard and the tablet shell being reversible with respect to one another and having at least three different configurations with respect to one another, including:
      i) a cover configuration in which a keyboard side of the keyboard is closed opposing an interior side of the tablet shell, and in which the tablet shell is magnetically attached to the channel in a first orientation;
      ii) a keyboard configuration in which the keyboard side of the keyboard and the interior side of the tablet shell are pivoted away from one another at an obtuse angle and exposed for use, and in which the tablet shell is magnetically attached to the channel in the first orientation; and
      iii) a reading configuration in which the keyboard side of the keyboard is closed opposing a back side of the tablet shell so that the cavity of the tablet shell faces outwardly, and in which the tablet shell is magnetically attached to the channel in a second orientation opposite the first orientation.

16. The device in accordance with claim 15, further comprising the keyboard having at least four different configurations with respect to the tablet shell, further including:
   a stand configuration in which the keyboard and the tablet shell are pivoted away from one another with a bottom of the keyboard disposed on a support surface and the back side of the tablet shell oriented at an acute angle with respect to the keyboard, and in which the tablet shell is magnetically attached to the channel in the second orientation.

17. The device in accordance with claim 15, wherein the proximal edge of the tablet shell overlaps the edge of the tablet computer to convert the non-symmetrical profile and the non-symmetrical patterned magnet array of the edge of the tablet computer to the symmetrically profile and the second symmetrical magnet array of the proximal edge of the tablet shell so that the proximal edge of the tablet shell physically and magnetically mates with the channel of the keyboard in both the first orientation and the second orientation.

18. The device in accordance with claim 15, wherein the tablet shell comprises a flexible and resilient material, and wherein the perimeter wall of the tablet shell is sized to provide a snap fit with the tablet computer.

19. The device in accordance with claim 18, wherein the perimeter wall of the tablet shell includes an inwardly projecting lip substantially circumscribing the cavity and having an interior opening defined between the projecting lip configured to be smaller than a perimeter of the tablet computer.

20. A reversible folio device in combination with a tablet computer having an edge with a non-symmetrical profile and a non-symmetrical patterned magnet array, the device comprising:
   a) a tablet shell with a back wall and a perimeter wall forming a cavity removably receiving the tablet computer therein;
   b) the tablet shell substantially covering a back, a perimeter and a front perimeter of an existing housing of the tablet computer;
   c) a proximal edge of the tablet shell having a symmetrical profile different from the non-symmetrical profile of the table computer;
   d) a keyboard pivotally and removably coupled to the tablet shell;
   e) a channel pivotally coupled to an edge of the keyboard;
   f) an interior of the channel removably receiving the proximal edge of the tablet shell, and having a symmetrical profile mating with the symmetrical profile of the tablet shell;
   g) a first symmetrical magnet array disposed in and carried by the channel and having magnets arrayed symmetrically about a longitudinal axis bisecting the keyboard;
   h) a second symmetrical magnet array carried by the proximal edge of the tablet shell and having magnets arrayed symmetrically about a longitudinal axis bisecting the tablet shell and different than the non-symmetrical patterned magnet array of the tablet computer and reversed with respect to first patterned magnet array of the channel;
   i) the proximal edge of the tablet shell adding the second symmetrical magnet array over the non-symmetrical patterned magnet array of the tablet computer to convert a unidirectional connection of the non-symmetrical patterned magnet array of the table computer to a reversible, multi-directional connection to removably couple the tablet shell, and thus the tablet computer, both physically and magnetically to the channel and the first magnet array of the keyboard;

j) the proximal edge of the tablet shell physically mates with the channel of the keyboard, and the second magnet array of the tablet shell magnetically mates with the first magnet array of the channel, in both a first orientation and a second orientation opposite the first orientation; and k) the keyboard and the tablet shell being reversible with respect to one another and having at least three different configurations with respect to one another, including:
  i) a cover configuration in which a keyboard side of the keyboard is closed opposing an interior side of the tablet shell, and in which the tablet shell is magnetically attached to the channel in the first orientation;
  ii) a keyboard configuration in which the keyboard side of the keyboard and the interior side of the tablet shell are pivoted away from one another at an obtuse angle and exposed for use, and in which the tablet shell is magnetically attached to the channel in the first orientation; and
  iii) a reading configuration in which the keyboard side of the keyboard is closed opposing a back side of the tablet shell so that the interior side of the tablet shell faces outwardly, and in which the tablet shell is magnetically attached to the channel in the second orientation opposite the first orientation.

21. The device in accordance with claim 20, further comprising the keyboard having at least four different configurations with respect to the tablet shell, further including:
  a stand configuration in which the keyboard and the tablet shell are pivoted away from one another with a bottom of the keyboard disposed on a support surface and the back side of the tablet shell oriented at an acute angle with respect to the keyboard, and in which the tablet shell is magnetically attached to the channel in the second orientation.

* * * * *

UNITED STATES PATENT AND TRADEMARK OFFICE
CERTIFICATE OF CORRECTION

| | | |
|---|---|---|
| PATENT NO. | : 8,817,457 B1 | |
| APPLICATION NO. | : 14/146438 | |
| DATED | : August 26, 2014 | |
| INVENTOR(S) | : Jim Colby et al. | |

It is certified that error appears in the above-identified patent and that said Letters Patent is hereby corrected as shown below:

In the Claims,

Column 9, line 53, "removable" should be --removably--.

Signed and Sealed this
Eleventh Day of November, 2014

Michelle K. Lee
*Deputy Director of the United States Patent and Trademark Office*